(12) United States Patent
Roth

(10) Patent No.: US 6,899,908 B2
(45) Date of Patent: May 31, 2005

(54) METHOD FOR PRODUCING A PH ENHANCED MEAT PRODUCT

(75) Inventor: Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 256 days.

(21) Appl. No.: 10/137,595

(22) Filed: May 2, 2002

(65) Prior Publication Data

US 2002/0127314 A1 Sep. 12, 2002

Related U.S. Application Data

(63) Continuation of application No. 09/213,190, filed on Dec. 17, 1998, now Pat. No. 6,389,838.

(51) Int. Cl.[7] .............................. A23B 4/16; A23L 1/31; A23L 1/317

(52) U.S. Cl. ...................... 426/319; 426/332; 426/335; 426/641

(58) Field of Search ................................. 436/319, 332, 436/335, 641; 426/319, 332, 335, 641

(56) References Cited

U.S. PATENT DOCUMENTS

| | | |
|---|---|---|
| 3,023,109 A | 2/1962 | Hines |
| 3,119,696 A | 1/1964 | Williams |
| 3,122,748 A | 2/1964 | Beebe, Jr. |
| 4,594,253 A | 6/1986 | Fradin |
| 4,642,239 A | 2/1987 | Ferrar et al. |
| 4,919,955 A | 4/1990 | Mitchell |
| 5,082,679 A | 1/1992 | Chapman |
| 5,393,547 A | 2/1995 | Balaban et al. |
| 5,433,142 A | 7/1995 | Roth |
| 5,731,023 A | 3/1998 | Milani |
| 5,871,795 A | 2/1999 | Roth |
| 6,045,845 A | 4/2000 | Gundt |
| 6,221,411 B1 | 4/2001 | Sanfilippo et al. |
| 6,270,829 B1 | 8/2001 | Shaklai |
| 6,408,598 B1 | 6/2002 | Stockley, III |

FOREIGN PATENT DOCUMENTS

| | | |
|---|---|---|
| CA | 671527 | 10/1963 |
| JP | SHO 64-39965 | 2/1989 |
| SU | 528923 | 12/1974 |
| WO | 9317562 | 9/1993 |

OTHER PUBLICATIONS

Abstract of Journal Article, "Effects of Chlorine and Ammonia Application Points on Bacterial Efficiency", by Means, E.G., et al., Journal American Water Works Association, 1986, 78(1) pp. 62–69, 14., abstract published by DIALOG Ascension No. 00321821.

(Continued)

Primary Examiner—Arthur L. Corbin
(74) Attorney, Agent, or Firm—Russell D. Culbertson; The Culbertson Group, P.C.

(57) ABSTRACT

A pH increasing material is placed in contact with the surface of an initial comminuted meat product. This contact with the pH increasing material increases the pH of the initial meat product to produce an intermediate meat product. The method also includes the step of removing the pH increasing material and preferably applying a driving force to the intermediate, pH increased meat product. The method may also include placing a pH lowering gas at a neutralizing pressure in contact with the surface of the intermediate meat product to decrease the pH of the meat product back to a final level.

17 Claims, 4 Drawing Sheets

OTHER PUBLICATIONS

Abstract of Journal Article, " Spoilage and Spoilage Indicators in Shark Held in Ice", by Waller, P.F., Food Technology in Australia, 1980, 32(3) pp. 164–164, 166., abstract published by DIALOG Ascension No. 00211466.

Eckhoff, S.R., Tuite, J.F., Foster, G.H., Kirleis, A.W. and Okos, M.R., "Microbial Growth Inhibition by SO2 or SO2 Plus NH3 Treatments During Slow Drying of Corn," Cereal Chemistry, 1983, 60(3), 183–188.

Fu, Haian and Burris R.H., "Ammonium Inhibition of Nitrogenase Activity in *Herbaspirillum seropedicae*," Journal of Bacteriology, 06–1989, 3168–3175.

Anand, C.P. and Rudra Setty, T.M., "Studies on the Chemical Control of Psychrophilic Bacterial Spoilage of Fish. iv–The Effect of Chemical Preservatives on the Growth of Psychorphilic Bacteria Isolated from Marine Fish," Fishery Technology, 1981, 18(1), 55–57.

Goodfellow, S.J., Bordeaux, F.M., Masters, B.A. and Brown, W.L., "How to Cope with Product Exposure to Ammonia," 10–1978, 32–33.

Jay, J.M., "Sources, Types, Incidence, and Behavior of Microorganisms in Food," 1986, 3rd Ed., Ch.3, 52–56, Ch.4, 71–72.

"How to Cope with Product Exposure to Ammonia"; Goodfellow, S.J., Bordeaus, F.M., Masters, B.A., Brown, W.L., Johnston, M.R.; Oct. 1978; pp 32–33.

ND FOR PRODUCING A PH
METHOD FOR PRODUCING A PH ENHANCED MEAT PRODUCT

CROSS-REFERENCE TO RELATED APPLICATION

This application is a continuation of U.S. patent application Ser. No. 09/213,190, filed Dec. 17, 1998, and entitled "APPARATUS AND METHOD FOR REDUCING MICROBE CONTENT IN FOODSTUFFS BY pH AND PHYSICAL MANIPULATION", now U.S. Pat. No. 6,389,838. The Applicant claims the benefit of this prior application pursuant to 35 U.S. C. §120. The entire content of this prior application is incorporated herein by this reference. The entire content of U.S. Pat. No. 5,871,795 is also hereby incorporated herein by reference. The content of U.S. Pat. No. 5,871,795 was incorporated by reference in the parent application Ser. No. 09/213,190.

TECHNICAL FIELD OF THE INVENTION

This invention relates to meat processing. More particularly, the invention relates to a method for adding ammonia to a meat product to produce a pH enhanced meat product and then modifying the pH of the meat product further by adding a pH lowering material such as carbon dioxide.

BACKGROUND OF THE INVENTION

Almost all foods are processed in some way before reaching the consumer. Meat products, for example, are separated from unusable or undesirable elements or components, ground or chopped, mixed or blended, and often times frozen for distribution. Even lightly processed meats are cut, trimmed, and then packaged for sale or distribution.

Microbes are part of the natural decay process of organic material and invariably appear or grow in foodstuffs as they are processed or handled. Although some microbes may be relatively benign, others contribute to spoilage and some can cause serious illness if consumed. Lactic acid producing bacteria are examples of benign microbes while some strains of *E. Coli*, Salmonella, Staph, and Listeria bacteria are examples of pathogens and can cause serious illness.

It is desirable to control the growth of pathogen microbes or reduce pathogen microbe count in foodstuffs. Historically, microbe growth has been reduced by chemical preservatives that remain in the product and are ultimately ingested by the consumer. However, a growing population of consumers has expressed a desire for food products that are free of traditional chemical preservatives. Alternatively to traditional chemical preservatives, heat has been used to kill microbes in foodstuffs. However, heat processing or sterilization often has an undesirable effect on the quality or characteristics of the foodstuff and may make the product undesirable to the consumer. Also, heat sterilization in meats can kill all microbes, leaving the meat susceptible to the rapid growth of dangerous microbes or pathogens after sterilization, should the previously sterilized meat be exposed to such microbes.

The prior related application Ser. No. 09/213,190, now U.S. Pat. No. 6,389,838 discloses an apparatus and method for physically manipulating a pH modified comminuted meat product to reduce the microbe content in the resulting product. The process includes freezing the pH modified meat product and then physically manipulating the frozen material to produce relative movement 34-317 between points within the material. This process of treating a pH modified meat product, which may be referred to as "freeze/stress processing," has been found to greatly reduce the live microbe count in the resulting product.

SUMMARY OF THE INVENTION

It is a general object of the invention to provide a method for producing a pH enhanced meat product. The pH enhanced meat product produced according to the invention is well suited for use in freeze/stress processing to dramatically reduce live microbe content in the resulting product.

The method of producing a pH enhanced meat product according to the invention includes placing ammonia in contact with an initial meat product. This contact with ammonia results in an intermediate meat product having a pH higher than the initial meat product. Once the intermediate meat product is produced, the method includes releasing or removing ammonia from the surface of the intermediate meat product and then preferably applying mechanical action to the intermediate meat product. This mechanical action provides a driving force to help drive ammonia deposited on the intermediate meat product into the meat and helps distribute the ammonia in the meat product. Removing ammonia from the surface of the intermediate meat product helps ensure that the mechanical action does not cause too much ammonia to be absorbed into the intermediate meat product, and produce an overly ammoniated product.

After increasing the pH of the meat product, the method according to the invention includes reducing the pH of the intermediate meat product with a suitable pH lowering material such as carbon dioxide for example. The pH lowering material is used to reduce the pH of the meat product from an intermediate level in the intermediate meat product to a final pH in a final product. Lowering the pH of the meat product includes placing the intermediate meat product with increased pH in contact with the pH lowering material. Mechanical action may then be applied to the meat product similarly to the mechanical action applied after contact with ammonia.

One preferred form of the invention applies ammonia in the form of a gas at relatively high pressures. Using high pressure ammonia gas allows the ammonia gas pressure to be held for only a very short operating period, on the order of seconds or fractions of a second, and still raise the pH at the surface of the meat product to a desired level. The relatively high pressure also serves as a driving force for driving the ammonia into the meat product.

As used in this disclosure and the following claims, the "surface" of the meat product means generally any surface that may be exposed to the ammonia. For example, the surface of ground meat may include the entire surface of each piece of ground meat and not just the surface of the aggregate made up of individual ground pieces.

While the preferred forms of the present invention apply ammonia in the form of a gas, it will be appreciated that the ammonia may be applied in solution with water within the scope of the invention. It is believed that the ammonia gas goes into solution in water in the initial meat product to form an ammonium hydroxide solution generally at the surface of the intermediate meat product. Where ammonia is added in the form of an ammonium hydroxide solution, it is believed that the ammonium hydroxide solution simply mixes with the water in the initial meat product to produce the desired intermediate meat product.

The method of the invention may be performed as a continuous process with an apparatus such as that disclosed in U.S. Pat. No. 5,433,142 or as a batch process. In either case, the apparatus for performing the process includes a container for containing the initial meat product and ammonia and also means for placing the initial meat product and ammonia in the container and for removing the intermediate meat product from the container after treatment. The continuous process apparatus also preferably includes means for compressing ammonia gas in contact with the meat product to the operating pressure and means for releasing the pressure after the operating period. In the batch process, the meat product may be held in a pressure vessel and ammonia gas may be introduced into the vessel under the desired operating pressure.

The ammonia releasing or removing step serves to remove any excess or free ammonia from the intermediate meat product. In one form of the invention, the ammonia releasing or removing step may include rinsing the surface of the intermediate meat product with a suitable inert gas or a liquid. In another preferred form of the invention, the ammonia releasing or removing step includes placing the previously treated meat under a vacuum to draw off excess ammonia gas from the intermediate product. In addition to applying a vacuum to the treated product, the temperature of the intermediate product may be increased to help release ammonia gas from the product. The intermediate meat product may also be agitated or blended while applying a vacuum.

The mechanical action according to the invention may be applied in a number of different fashions. The agitation or blending while removing ammonia from the surface of the intermediate meat product may be referred to as a primary mechanical action. Pumping the intermediate meat product through a conduit also applies the desired mechanical action to the intermediate meat product. An initial mechanical action by pumping the intermediate meat product may be applied prior to the primary mechanical action. A secondary mechanical action by pumping the intermediate meat product may be applied after the primary mechanical action.

These and other objects, advantages, and features of the invention will be apparent from the following description of the preferred embodiments, considered along with the accompanying drawings.

DESCRIPTION OF THE PREFERRED EMBODIMENTS

Figure 1:
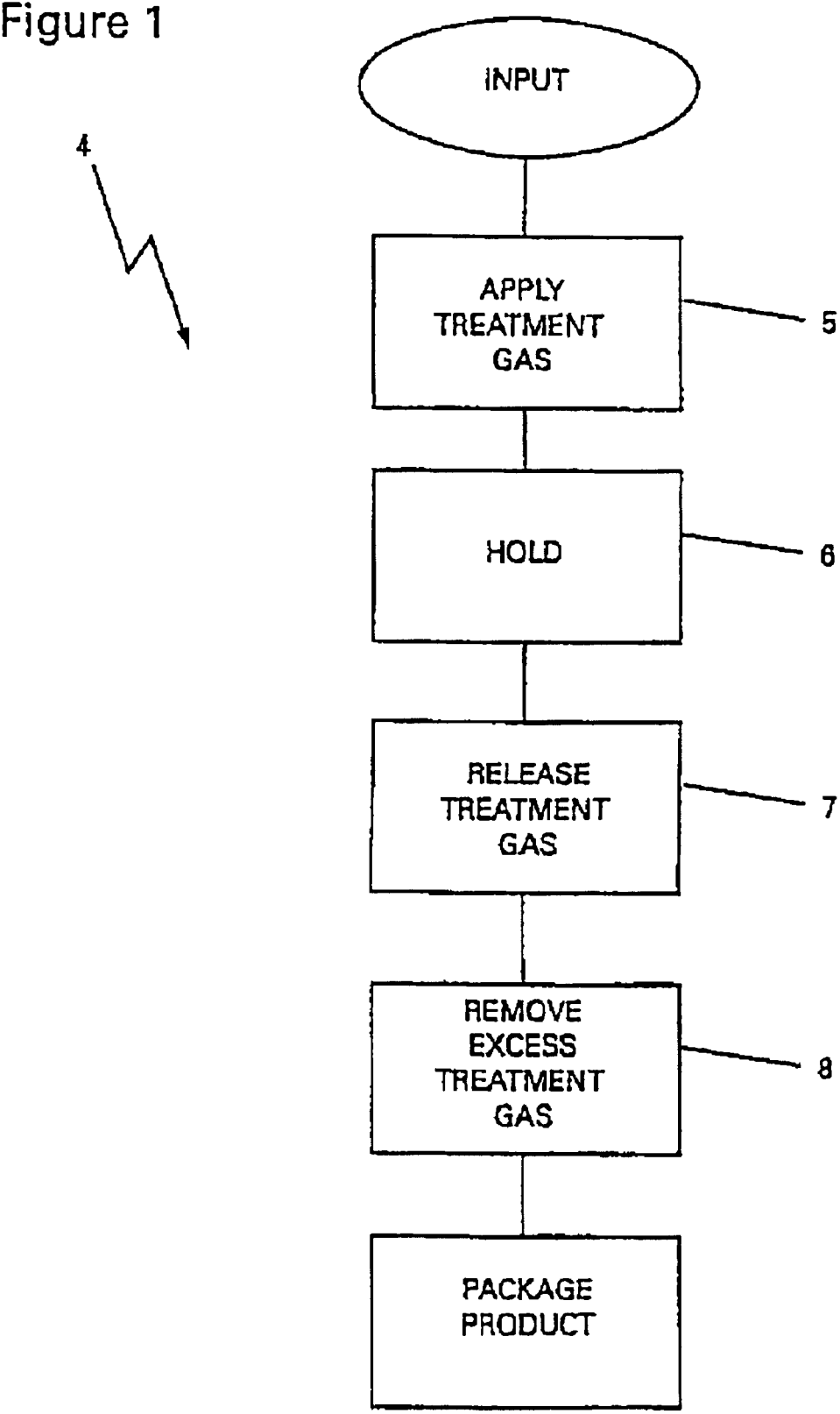
FIG. 1 is a block diagram showing method steps performed according to one preferred form of the invention.

FIG. 1 illustrates a method embodying the principles of the invention for using ammonia gas as a treatment gas to modify the pH of an initial comminuted meat product to produce a pH enhanced meat product. The method 4 shown in FIG. 1 includes first, at block 5, placing ammonia gas under a desired operating pressure in contact with the surface of the initial comminuted meat product. As shown at block 6, the method next includes holding the ammonia gas and meat product under the operating pressure for an operating period sufficient to increase the pH of the initial meat product to a desired level. After holding the meat product and ammonia gas under the operating pressure for the operating period, the method depicted in FIG. 1 includes releasing the gas pressure at block 7. This releasing step is preferably done quickly or instantaneously to put the maximum physical stress on the microbes then existing in the meat product.

Although FIG. 1 illustrates the ammonia gas application, hold, and release steps as separate steps, the time for performing each step may be very short. Applying and releasing the ammonia gas may be done almost instantaneously, with the operating period representing the short time between pressurization and release. Short treatment times or operating periods are obtained by using an operating pressure that is at or above the equilibrium vapor pressure or vapor pressure of the ammonia gas at the temperature of the meat product being treated. For example, when the meat product is held at 38 degrees F., the operating pressure for ammonia gas must be 55.7 psig or more to produce the desired pH increase in a short period of time, on the order of one to thirty seconds or less. At 60 degrees F., the ammonia gas operating pressure would be at or above 92.9 psig. At higher operating pressures, between 2,500 to 3,000 psi, for example, the operating period may be less than 1 second to achieve a significant pH increase. The preferred operating pressure ranges from 2000 psi to 4500 psi, while the temperature of the meat product being treated is maintained in a temperature ranging from 33 degrees F. to 110 degrees F.

The method 4 shown in FIG. 1 concludes with step 8, removing the ammonia gas from the meat product being processed. This gas removal step removes the free ammonia gas but leaves the meat product with the desired increased pH. The gas removal step may include simply applying a vacuum to evacuate the gas or flushing the meat product with an inert food processing gas such as Nitrogen, Oxygen, or Helium. With either applying a vacuum or flushing with an inert gas, the method may additionally include applying heat to the meat product being processed to help remove excess ammonia gas.

When ammonia gas is in contact with the initial meat product being processed, it is believed that the moisture in the meat product absorbs the ammonia gas to form ammonium hydroxide ($NH_4OH$). The free hydroxyl ions from the ammonium hydroxide in the meat product produce the increased pH. It will therefore be appreciated that the desired pH change may be accomplished by applying ammonia in any fluid form. That is, the ammonia may be applied as a gas which is absorbed in water in the initial meat product to form ammonium hydroxide solution, or the ammonia may be added in the form of ammonium hydroxide solution which mixes with the moisture in the initial meat product to produce the desired intermediate meat product having an increased pH with respect to the initial meat product.

The same pressurization, hold, and release cycle shown in FIG. 1 may be employed for decreasing the pH of the treated meat product. However, in this cycle the treatment gas comprises a suitable pH lowering gas such as carbon dioxide gas or a suitable liquid or solid pH lowering material dispersed in a suitable carrier gas. The method includes placing the treated meat product with increased pH in contact with the pH lowering gas at a neutralizing pressure, holding the pressure for a neutralizing period, and releasing the pressure after the desired period. As with the release step in the pH increasing method, the release step in the pH lowering method preferably comprises releasing the pressure substantially instantaneously to physically stress the microbes in the meat product. The neutralizing pressure is preferably a pressure above the vapor pressure of the treatment gas at the temperature of the meat product being processed.

As with the pH increasing method according to the steps shown in FIG. 1, the pH lowering method preferably concludes with the step of removing the pH lowering treatment gas from contact with the meat product being processed. This step may include subjecting the meat product to a vacuum or flushing the meat product with an inert food processing gas. Additionally the step of removing the treatment gas may include heating the meat product to help remove excess pH lowering gas from the meat product, additional pH increasing gas, or their reaction products.

The Treatment Apparatus

Figure 2:
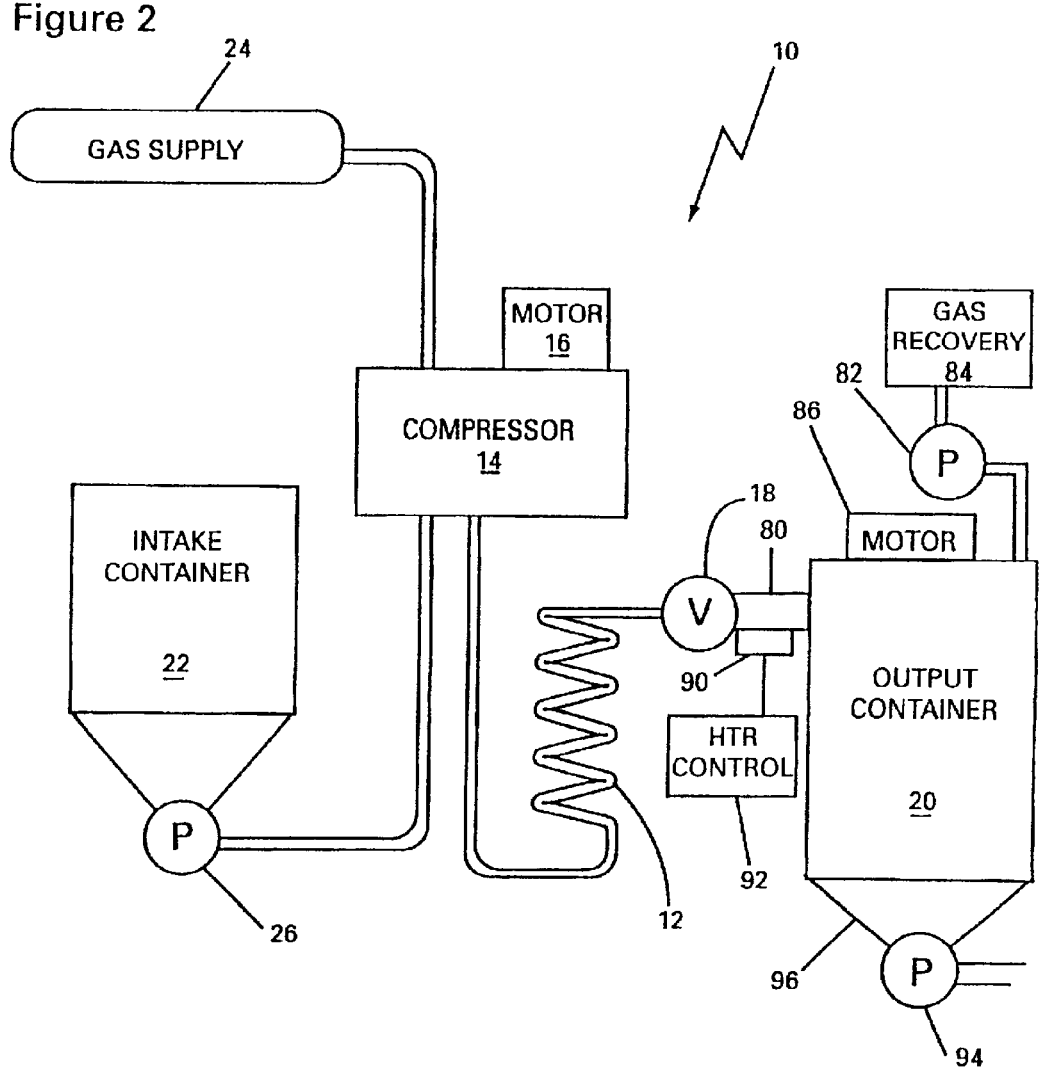
FIG. 2 is mostly a diagrammatic view of an apparatus for performing a method embodying the principles of the invention in a continuous process.
Figure 3:
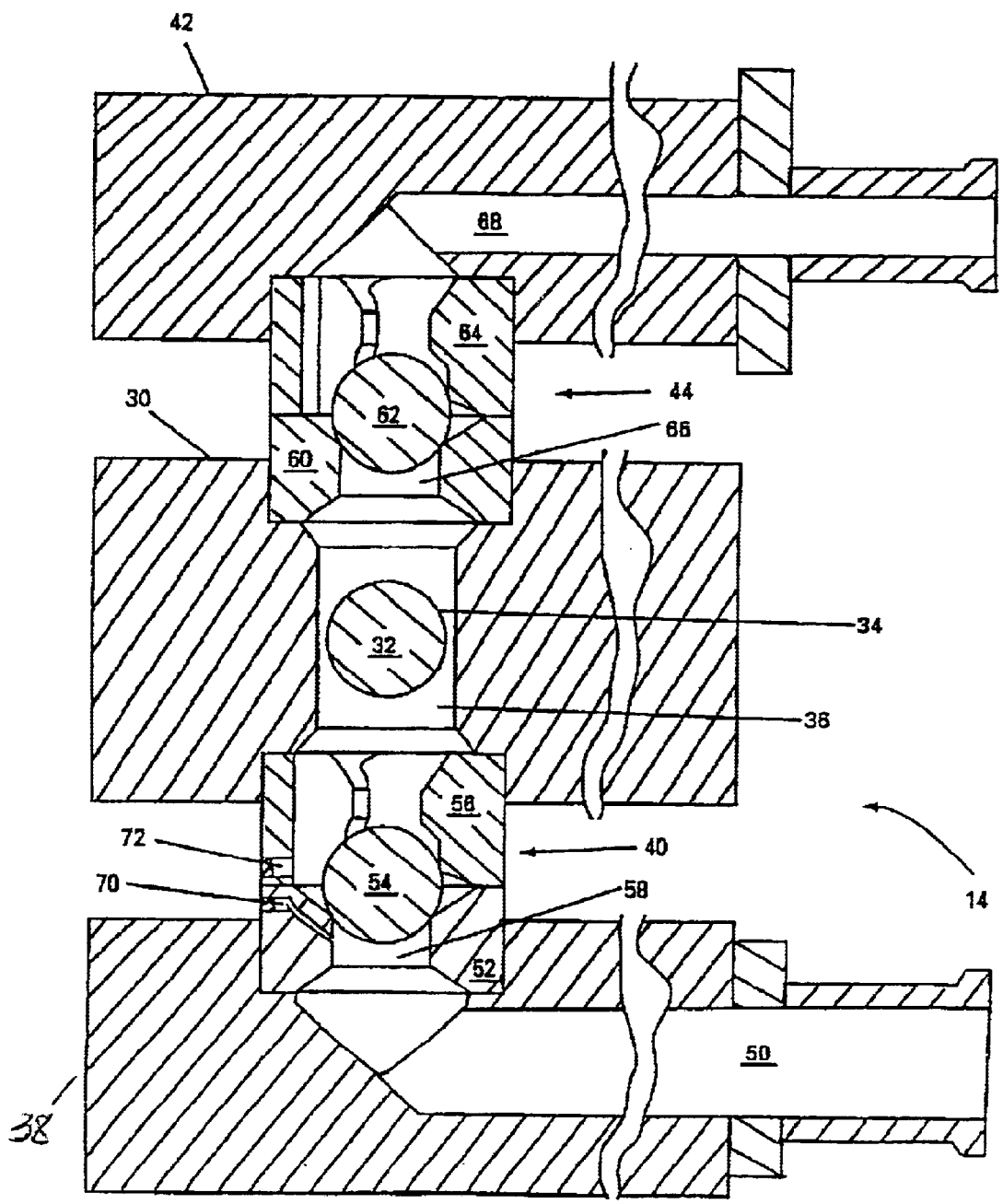
FIG. 3 is a partial longitudinal section view of the compressor used in the apparatus shown in FIG. 2.

FIGS. 2 and 3 show a preferred apparatus 10 for processing ground meat, or the like, according to the method of the invention. Referring to FIG. 2, the apparatus 10 includes means, in this case processing conduit 12, for containing the initial meat product and treatment gas under the desired operating pressure. The pressure is applied by a compressor or pump 14 driven by a suitable motor 16. A flow-restricting valve or other device 18 is associated with the conduit 12 for holding a back-pressure against the pressure applied by the compressor 14. The flow-restricting valve 18 opens to an output container 20, which is used in removing excess treatment gas from the intermediate meat product. The initial meat product to be processed in be the apparatus 10 is pumped from an in-take container 22 by feed pump 26 to the compressor 14, and the treatment gas supply 24 provides treatment gas which is then compressed in contact with the initial meat product.

The form of the invention shown in FIG. 2 provides for continuous processing with continuous meat product intake, compression with the treatment gas, holding under the operating pressure, and then pressure release. In this continuous processing form of the invention, other processing equipment may be connected in the conduit 12 or elsewhere for performing other functions on the meat product before the treatment gas pressure is released at device 18.

FIG. 3 illustrates the preferred compressor or pump 14. The compressor 14 includes a cylinder head 30 with a piston 32 adapted to reciprocate within a cylinder 34 which opens into a chamber 36 in the cylinder head. As seen from the perspective of FIG. 3, the piston 32 would move transverse to the plane of the paper. An inlet manifold 38 is connected to the cylinder head 30 with an inlet valve 40, and an outlet manifold 42 is connected to the cylinder head via an outlet valve 44. Although FIG. 3 is broken away to show only one piston and cylinder arrangement in the cylinder head 30, it will be readily apparent to those skilled in the art that the compressor 14 could, and preferably would, include additional piston and cylinder arrangements. In one preferred form, compressor 14 includes three separate pistons.

The inlet manifold 38 includes an inlet manifold passage 50 through which the meat product reaches the inlet valve 40. The illustrated inlet valve 40 is a check valve comprising a seat 52, ball 54, and ball retainer 56, and defines an inlet passage 58 to the cylinder head chamber 36. Similarly, the outlet valve 44 comprises a check valve having a seat 60, ball 62, and ball retainer 64, and defines an outlet passage 66 connecting the cylinder head chamber 36 to a passage 68 extending through the outlet manifold 42.

The treatment gas is preferably supplied to the compressor 14 for compressing with the initial meat product, even though in other forms of the invention the treatment gas may simply be applied to the initial meat product under the desired operating pressure. The illustrated form of the invention shows two alternate injection points for injecting treatment gas to place the treatment gas in contact with the initial meat product. The first treatment gas injection port 70 extends through the seat 52 of the inlet valve 40 on the inlet manifold side of the inlet valve ball 54. Treatment gas injected into the inlet manifold passage 50 through this first injection port 70 under a suitable pressure is drawn into the cylinder head chamber 36 along with the initial meat product. The alternate, second injection port 72 extends into the inlet passage 58 on the cylinder head side of the inlet valve ball 54. Thus the treatment gas injected through this second port 72 is injected directly into the cylinder head chamber 36 for compressing with the initial meat product.

Referring again to FIG. 2, after releasing the treatment gas pressure at valve 18, the treated, intermediate meat product travels through output conduit 80 to the output container 20. The excess treatment gas removal step described with reference to FIG. 1 (block 8) may be performed by applying a vacuum to container 20 with vacuum pump 82. The vacuum pump 82 may discharge into a gas recovery system 84 for recovering the treatment gas or for disposing of the gas. Also, the container 20 may have associated with it a motor 86 for driving an agitator or blender mechanism (not shown) within the container. Applying mechanical action by blending or agitating intermediate meat product in the container helps expose the meat product to the vacuum to ensure better removal of excess or free treatment gas. In addition to the application of a vacuum and the agitation of the meat product, the product may be heated to a desired temperature to help release treatment gas. The heat may be applied by a heating element as the meat product travels through the output conduit 80. The heating element 90 is associated with the conduit 80 and may be controlled through a heater control 92. The heat may be applied electrically or with any other suitable heating device to heat the meat to a desired temperature. Also, heat may be applied earlier in the process if desired. For example, the meat product may be heated in conduit 12 by a suitable process.

The treated meat product is removed from the container 20 through a suitable pump 94 mounted at the bottom of a hopper 96, which forms the bottom of container 20. Alternatively to the pump 94, an auger may be used to remove meat product from container 20. In any event, the pump or auger is operated at a rate sufficient to maintain a level of meat product in the container 20. Maintaining a level of meat product in the bottom of container 20 allows better control of the vacuum applied to the container through vacuum pump 82.

The intermediate, pH increased meat product which is produced by apparatus 10 will commonly be subjected to further processing for storage or shipment. For example, the meat product may be tempered and put through a suitable process for separating fat from lean meat. Also, the final lean meat product may be frozen and cut into chips for packaging and shipment.

Mechanical action according to the invention is applied to the meat product or intermediate meat product at three separate points in the form of the invention illustrated in FIG. 2. The primary mechanical action is applied to the intermediate meat product by the blender mechanism in output container 20, driven by motor 86. An initial mechanical action is applied to the initial/intermediate meat product as it is acted upon by compressor 14 and forced through conduit 12. Also, a secondary mechanical action is applied to the intermediate meat product as it is pumped or augered from output container through output conduit 98.

The operation of apparatus 10 may now be described with reference to FIGS. 2 and 3. The apparatus 10 shown in FIG. 2 uses the reciprocating piston pump or compressor 14 to place the initial meat product in contact with the treatment gas under the operating pressure. As shown in FIG. 2, the feed pump 26 pumps meat product from the intake container 22 to the inlet manifold passage 50 (FIG. 3) of the compressor 14 under an inlet pressure. Referring now to FIG. 3, as the piston 32 withdraws into the cylinder 34, it creates a low pressure in the cylinder head chamber 36 causing the ball 62 of the outlet valve 44 to seat and the ball 54 of the inlet valve 40 to unseat, drawing the initial meat product into the cylinder head from the inlet manifold passage 50. When the first treatment gas injection port 70 is used, treatment gas is injected into the inlet manifold passage 50 and the treatment gas is drawn into the cylinder head chamber 36 along with the initial meat product. Alternatively, when the second port 72 is used, the treatment gas is injected directly into the cylinder head chamber 36 preferably during the intake stroke of the piston 32 or just as the piston starts on the compression stroke. In either case, when the piston 32 returns through the cylinder 34 in the compression stroke, it increases the pressure in the cylinder head chamber 36 causing the inlet ball 54 to seat in the inlet valve 38. The pressure continues to rise in the cylinder head chamber 36 until the pressure passes the pressure held in the outlet manifold passage 66 and processing conduit 12 by the flow restricting back-pressure device 18. At this point, the outlet valve ball 62 unseats to allow the meat products and treatment gas under the operating pressure to move into the outlet manifold passage 66.

The pumping or compressing process continues each cycle of the piston 32 to compress the initial meat product and treatment gas and transport the compressed treatment gas and meat product through the outlet manifold passage 66 and into the processing conduit 12. In this continuous pressurizing, holding, and releasing process, the pump speed and the processing conduit length are chosen to provide travel time of the meat product and compressed treatment gas in the processing conduit 12 equal to the required operating period to produce the desired pH altering effect in the initial meat product.

After holding the initial meat product in contact with the treatment gas under the operating pressure for the operating period to produce the desired intermediate meat product, the method continues with the step of releasing the pressure across the flow restricting device 18. Preferably, the pressure is released substantially instantaneously across the device 18 as the intermediate meat product is delivered into the output container 20. The step of removing the treatment gas may be performed in the output container 20 by applying the desired vacuum to the container with vacuum pump 82 alone and preferably by agitating the material in the container 20 with a suitable blender mechanism (not shown) driven by motor 86. Heat may be applied to the meat product through heater 90 to assist in treatment gas removal under the vacuum.

Alternatively to the continuous processing method possible with the apparatus 10 shown in FIGS. 2 and 3, the method of the invention encompasses a batch process. In this batch process, the step of placing the meat product in contact with the treatment gas under the operating pressure includes placing the meat product in a pressure vessel and then applying the treatment gas under the operating pressure. The operating pressure is then simply held on the pressure vessel for the operating period. This batch method is preferable, or may be required, for some meat products that cannot easily be passed through the valves of a reciprocating compressor as shown in FIG. 3. In any event, in the batch process, the step of releasing the pressure may be accomplished simply by releasing treatment gas pressure through a suitable pressure release device associated with the pressure vessel.

Operating or neutralizing pressures at near atmospheric pressure provide significant pH effect. However, the lower operating pressures require longer operating periods to produce a given pH modification. Alternatively, relatively high operating or neutralizing pressures, from at or above the vapor pressure of the treatment gas at the temperature of the meat being processed to several thousand psi may be employed in the method of the invention to produce the desired pH effect at a shorter operating period and also to produce microbe kill by physically stressing the microbes. Also, multiple pressurization, hold, and release cycles may be employed within the scope of the invention to produce the desired pH altering effects. The different pressurization cycles may have different pressure, duration, and treatment gas all within the scope of the invention.

Figure 4:
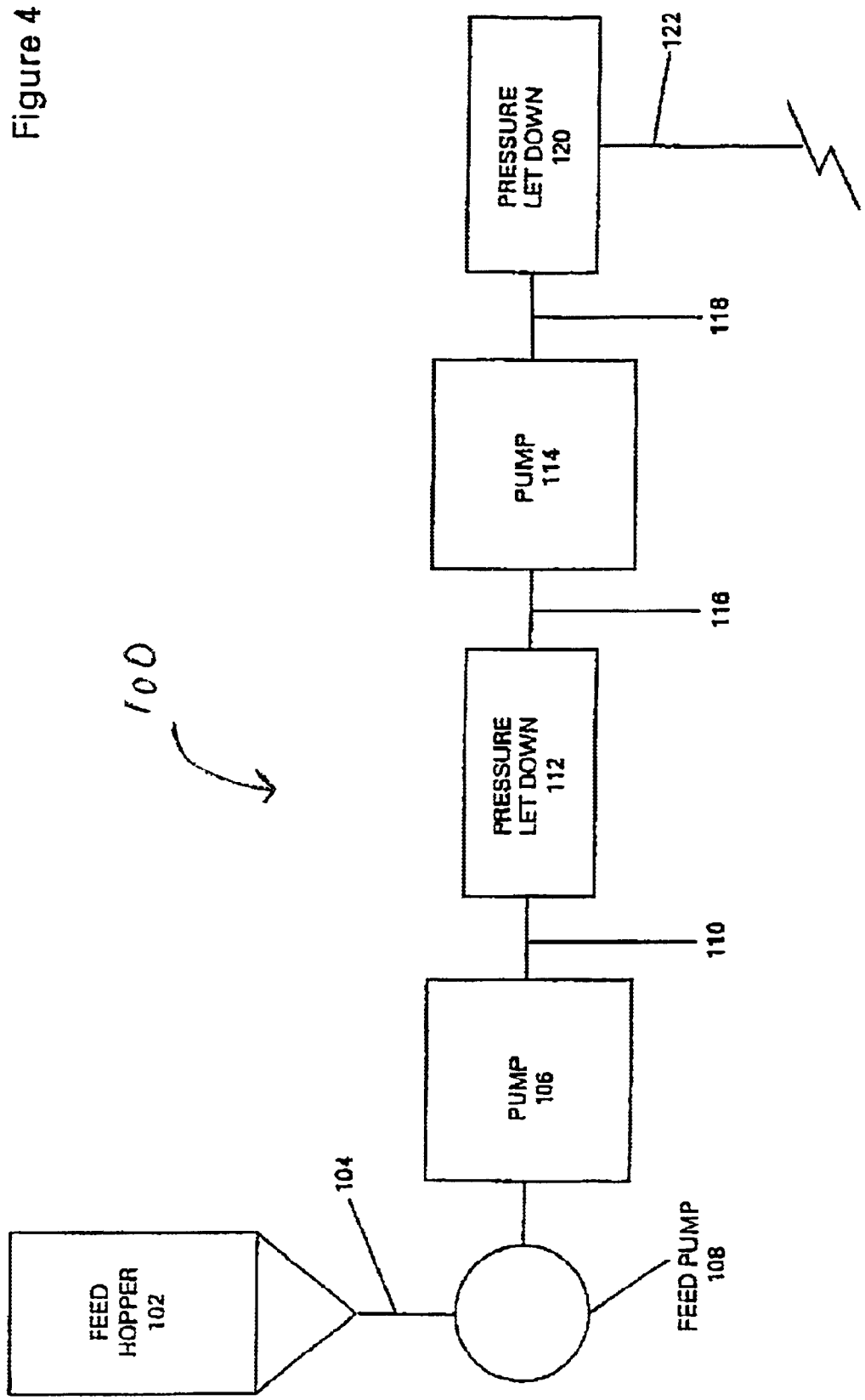
FIG. 4 is a diagrammatic representation of an apparatus embodying the principles of the invention for performing back-to-back pH increasing and pH lowering according to the invention.

FIG. 4 illustrates an apparatus 100 for performing the pH increasing process back-to-back with the pH lowering process according to the invention. The apparatus 100 includes a feed hopper 102 connected by conduit 104 to a first processing pump or compressor 106. The first processing pump 106 may be similar to the pump 14 shown in FIGS. 2 and 3. A feed pump 108 may be positioned in the conduit 104 for feeding meat product to the first processing pump 106 under a suitable feed pressure.

In the illustrated back-to-back treatment apparatus 100, a conduit 110 connects the output of the first processing pump 106 to a suitable pressure let down arrangement 112. Although pressure reduction is not necessary at this point, it is preferable to reduce the pressure with the pressure let down arrangement 112 to a relatively low pressure for introducing the meat being processed through conduit 116 to the second processing pump/compressor 114. This second processing pump 114 may also comprise a pump similar to pump 14 shown in FIGS. 2 and 3. Conduit 118 connects the output from the second processing pump 114 to a second pressure let down arrangement 120 which may comprise a hopper arrangement similar to the hopper 20 shown in FIG. 2. The second pressure let down arrangement 120 preferably reduces the pressure on the meat being processed to around atmospheric pressure. An output conduit 122 may direct the processed meat product to a suitable freezer, for example, or other processing equipment.

The first processing pump 106 is used to introduce the pH increasing gas and apply the operating pressure as discussed with reference to FIG. 1. The pH increased meat product is then treated with the pH lowering gas introduced in the second pump 114, preferably after the pressure on the meat product is reduced in the first pressure let down arrangement 112. The second pump 114 applies the desired neutralizing pressure. In the preferred form of the invention, the pH increasing gas utilized in pump 106 is ammonia gas and the pH lowering gas is carbon dioxide gas.

The above described preferred embodiments are intended to illustrate the principles of the invention, but not to limit the scope of the invention. Various other embodiments and modifications to these preferred embodiments may be made by those skilled in the art without departing from the scope of the following claims. For example, the vacuum for helping to remove excess treatment gas may be applied in the output conduit 80 or at some other point in the process rather than in the output container 20 as discussed above.

Also, heat may be applied as desired while the material being processed passes through the output conduit 80, or at any other suitable point in the process such as in the output container 20 or in the treatment conduit 12 shown in FIG. 2.

What is claimed is:

1. A method for producing a pH enhanced meat product, the method including the steps of:
   (a) placing an initial meat product having an initial pH in contact with ammonia to produce an intermediate meat product having an intermediate pH higher than the initial pH; and
   (b) placing the intermediate meat product in contact with carbon dioxide to produce a final meat product having a final pH lower than the intermediate pH.

2. The method of claim 1 further including the step of applying mechanical action to the intermediate meat product.

3. The method of claim 2 wherein the step of applying mechanical action includes pumping the intermediate meat product through a conduit.

4. The method of claim 2 wherein the step of applying mechanical action includes agitating the intermediate meat product in a vessel.

5. The method of claim 1 further including the step of applying mechanical action to the final meat product.

6. The method of claim 5 wherein the step of applying mechanical action includes pumping the final meat product through a conduit.

7. The method of claim 5 wherein the step of applying mechanical action includes agitating the final meat product in a vessel.

8. The method of claim 1 wherein the initial meat product comprises comminuted meat and further including the steps of:
   (a) applying mechanical action to the intermediate meat product; and
   (b) applying mechanical action to the final meat product.

9. A method for producing a pH enhanced meat product, the method including the steps of:
   (a) applying ammonia to a meat product to increase the pH of the meat product from an initial pH to an intermediate pH higher than the initial pH; and
   (b) applying carbon dioxide to the meat product to decrease the pH of the meat product from the intermediate pH to a final pH lower than the intermediate pH.

10. The method of claim 9 further including the step of applying mechanical action to the meat product after applying ammonia.

11. The method of claim 10 further including the step of applying mechanical action to the meat product after applying the pH lowering material.

12. The method of claim 9 further including the step of applying mechanical action to the meat product after applying the pH lowering material.

13. The method of claim 9 wherein the meat product is comminuted meat.

14. A method of treating meat products, the method including the steps of:
   (a) cycling the pH of a meat product from an initial pH to an intermediate pH by application of ammonia to the meat product, and then from the intermediate pH to a final pH by application of carbon dioxide to the meat product, the intermediate pH being higher than the initial pH and the final pH being lower than the intermediate pH; and
   (b) applying a driving force to the meat product after the application of ammonia and before the application of the carbon dioxide.

15. The method of claim 14 wherein the step of applying the driving force comprises holding ammonia gas and the meat product under an operating pressure.

16. The method of claim 14 wherein the driving force is applied by applying mechanical action to the meat product.

17. The method of claim 15 wherein the step of applying the mechanical action to the meat product includes pumping the meat product through a conduit or agitating the meat product in a vessel.

\* \* \* \* \*